(12) United States Patent
Endo

(10) Patent No.: US 9,431,860 B2
(45) Date of Patent: Aug. 30, 2016

(54) ROTOR AND METHOD OF MANUFACTURING ROTOR

(75) Inventor: Yasuhiro Endo, Toyota (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 430 days.

(21) Appl. No.: 13/389,737

(22) PCT Filed: Dec. 22, 2009

(86) PCT No.: PCT/JP2009/071280
§ 371 (c)(1),
(2), (4) Date: Feb. 9, 2012

(87) PCT Pub. No.: WO2011/077513
PCT Pub. Date: Jun. 30, 2011

(65) Prior Publication Data
US 2012/0139378 A1    Jun. 7, 2012

(51) Int. Cl.
H02K 1/27 (2006.01)
H02K 1/28 (2006.01)
H02K 15/03 (2006.01)

(52) U.S. Cl.
CPC .............. *H02K 1/2766* (2013.01); *H02K 1/28* (2013.01); *H02K 15/03* (2013.01); *Y10T 29/49012* (2015.01)

(58) Field of Classification Search
CPC ........ H02K 1/27; H02K 1/18; H02K 1/2706; H02K 1/2766; H02K 1/2773; H02K 1/28
USPC ........................... 310/156.21, 156.53, 156.56
See application file for complete search history.

(56) References Cited

U.S. PATENT DOCUMENTS 5,117,553 A * 6/1992 Kliman .......................... 29/598
6,008,559 A * 12/1999 Asano et al. ............ 310/156.53
6,342,745 B1 * 1/2002 Sakai et al. ............... 310/156.56
2002/0047435 A1   4/2002 Takahashi et al.
2004/0217666 A1 * 11/2004 Mellor et al. ............ 310/156.53
2007/0228858 A1   10/2007 Malmberg
2009/0026867 A1   1/2009 Haruno et al.
2009/0045689 A1 * 2/2009 Haruno et al. ........... 310/156.56
2009/0134732 A1 * 5/2009 Shichijoh et al. ........ 310/156.53
2012/0285004 A1   11/2012 Haruno et al.

FOREIGN PATENT DOCUMENTS

| CN | 1957514 A | 5/2007 |
|---|---|---|
| JP | 60-234450 A | 11/1985 |
| JP | 2001-339919 A | 12/2001 |
| JP | 2004154466 A | 6/2004 |
| JP | 2005-94845 A | 4/2005 |
| JP | 2007-097387 A | 4/2007 |
| JP | 2007236020 A | 9/2007 |
| JP | 2009-124899 A | 6/2009 |
| JP | 2009-303293 A | 12/2009 |

OTHER PUBLICATIONS

International Search Report of PCT/JP2009/071280, dated Mar. 16, 2010.

* cited by examiner

*Primary Examiner* — Thomas Truong
(74) *Attorney, Agent, or Firm* — Sughrue Mion, PLLC

(57) ABSTRACT

A rotor that can reduce the used amount of resin for securing a permanent magnet is provided. The rotor includes a rotor core provided fixedly to a rotation shaft and having a magnet insertion hole extending in an axial direction formed therein, a permanent magnet embedded in the magnet insertion hole and extending in the axial direction and extending in a direction inclined relative to a radial direction of the rotor core, and a resin layer that secures the permanent magnet to the rotor core. The resin layer covers a surface of the permanent magnet and is in contact with an inner surface of the magnet insertion hole. A hollow space extending in the axial direction is left in the magnet insertion hole at an inner side in the radial direction relative to the permanent magnet. Part of the inner surface of the magnet insertion hole is exposed to the hollow space.

4 Claims, 9 Drawing Sheets

ROTOR AND METHOD OF MANUFACTURING ROTOR

CROSS REFERENCE TO RELATED APPLICATIONS

This application is a National Stage of International Application No. PCT/JP2009/071280 filed Dec. 22, 2009, the contents of all which are incorporated herein by reference in their entirety.

TECHNICAL FIELD

The present invention relates to a rotor and a method of manufacturing the rotor, and more particularly to a rotor having a structure in which permanent magnets are inserted in a rotor core, and a method of manufacturing the rotor.

BACKGROUND ART

Conventionally, various techniques for a rotor having a structure in which permanent magnets are inserted in a rotor core have been proposed. For example, Japanese Patent Laying-Open No. 2007-97387 (PTL 1) proposes a rotor having a rotor iron core, permanent magnets embedded respectively at a plurality of magnetic pole formation positions set along the outer circumference of the rotor iron core, iron core portions magnetized by the permanent magnets at the respective magnetic pole formation positions to form magnetic poles at a surface opposed to an air gap, and recesses each extending in the axial direction provided at the circumferentially central position in the surface opposed to the air gap of each iron core portion.

Japanese Patent Laying-Open No. 2009-124899 (PTL 2) proposes a rotor having a magnetically soft segment between magnetic salient poles, with a front-side permanent magnet being provided between the leading-end side surface of a front-side magnetic salient pole and the front end of the segment, and a back-side permanent magnet being provided between the leading-end side surface of the back-side permanent magnet and the front end of the segment.

CITATION LIST

Patent Literature

PTL 1: Japanese Patent Laying-Open No. 2007-97387
PTL 2: Japanese Patent Laying-Open No. 2009-124899

SUMMARY OF INVENTION

Technical Problem

In the rotors disclosed in the above-described pieces of Patent Literature, air gaps are left at the both ends of permanent magnets with the permanent magnets being inserted in magnet insertion holes formed in the rotor core. A radially inner air gap proximate to the rotation shaft is larger than a radially outer air gap proximate to the stator. Between the radially inner air gap and another air gap adjacent in the circumferential direction of the rotor core, a wall separating these air gaps is formed.

By devising the shape of magnet insertion holes in which the permanent magnet are inserted, the permanent magnets are held within the magnet insertion holes, however, the permanent magnets cannot be fixed sufficiently only by this device. Therefore, the air gaps at the both ends of the permanent magnets are filled with magnet-securing resin. In such a case of making the radially inner air gaps larger as in the rotor disclosed in the above-described pieces of Patent Literature, the used amount of magnet-securing resin will increase. When the rotor rises in temperature, the resin that fills the air gaps thermally expands, and a stress generated by resin thermal expansion acts on the wall between the air gaps. If the amount of resin that fills the air gaps increases, the amount of resin thermal expansion will also increase and the stress acting on the wall will also increase, so that the wall is more likely to be damaged.

The present invention was made in view of the above-described problems, and has a main object to provide a rotor that can reduce the used amount of resin for securing permanent magnets embedded in the rotor core. Another object of the present invention is to provide a method of manufacturing a rotor that can easily manufacture the above-described rotor.

Solution to Problem

A rotor according to an aspect of the present invention includes a rotor core provided fixedly to a rotation shaft and having a hole extending in an axial direction formed therein, a magnet embedded in the hole and extending in the axial direction and extending in a direction inclined relative to a radial direction of the rotor core, and a resin layer that secures the magnet to the rotor core. The resin layer covers a surface of the magnet and is in contact with an inner surface of the hole. A hollow space extending in the axial direction is left in the hole at an inner side in the radial direction relative to the magnet. Part of the inner surface of the hole is exposed to the hollow space.

Preferably, the above-described rotor includes a partition member disposed in the hole to separate the resin layer and the hollow space.

Preferably, the magnet partitions the hole in the radial direction to define, in the hole, an outer region at an outer side in the radial direction and an inner region at the inner side in the radial direction. The inner region has a capacity larger than a capacity of the outer region.

Preferably, the rotor core has formed therein an other hole extending in the axial direction and adjacent to the hole in a circumferential direction of the rotor core. The rotor core includes a wall that separates the hole and the other hole in the circumferential direction. The wall has a most proximate portion at an innermost side in the radial direction where the hole and the other hole are most proximate to each other. A side surface of the most proximate portion is exposed to the hollow space.

A method of manufacturing a rotor according to another aspect of the present invention includes the steps of preparing a rotor core having a hole extending in an axial direction formed therein, embedding a magnet in the hole so as to partition the hole in the radial direction to define, in the hole, an outer region at an outer side in the radial direction and an inner region at an inner side in the radial direction, inserting a resin mold in the inner region, filling an air gap between the magnet and the resin mold with an adhesive for securing the magnet to the rotor core, curing the adhesive to form a resin layer, and removing the resin mold from the inner region.

A method of manufacturing a rotor according to still another aspect of the present invention includes the steps of preparing a rotor core having a hole extending in an axial direction formed therein, embedding a magnet in the hole so as to partition the hole in the radial direction to define, in the hole, an outer region at an outer side in the radial direction and an inner region at an inner side in the radial direction, inserting a partition member that partitions the inner region, in the inner region, a step of filling an air gap between the magnet and the partition member with an adhesive for securing the magnet to the rotor core, and a step of curing the adhesive to form a resin layer.

Advantageous Effects of Invention

According to the rotor of the present invention, the used amount of resin for securing the permanent magnet embedded in the rotor core can be reduced.

DESCRIPTION OF EMBODIMENTS

Hereinbelow, embodiments of the present invention will be described based on the drawings. It is noted that, in the following drawings, the same reference number denotes same or corresponding parts, and description thereof will not be repeated.

(First Embodiment)

Figure 1:
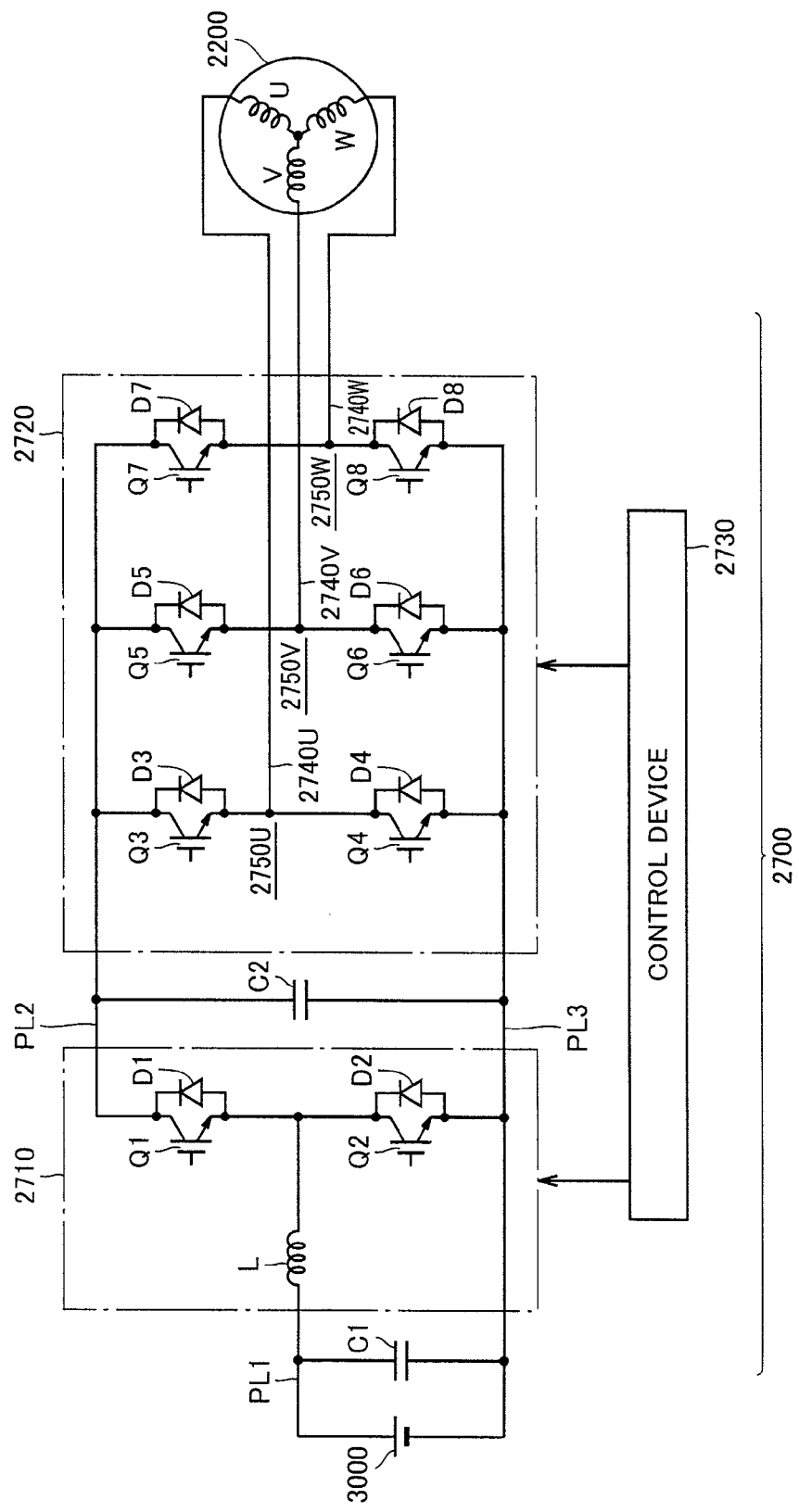
FIG. 1 is a diagram for explaining a structure of a drive unit of a vehicle equipped with a rotating electric machine including a rotor according to a first embodiment of the present invention.

FIG. 1 is a diagram for explaining a structure of a drive unit of a vehicle equipped with a rotating electric machine 2200 including a rotor 120 according to the first embodiment of the present invention. FIG. 1 shows an electric circuit for driving rotating electric machine 2200 mounted on the vehicle according to the present invention. Referring to FIG. 1, a PCU (Power Control Unit) 2700 includes a converter 2710, an inverter 2720, a control device 2730, capacitors C1, C2, power source lines PL1 to PL3, and output lines 2740U, 2740V, 2740W. Converter 2710 is connected between a battery 3000 and inverter 2720, and inverter 2720 is connected to rotating electric machine 2200 with output lines 2740U, 2740V and 2740W.

Battery 3000 connected to converter 2710 is, for example, a secondary battery, such as a nickel hydride battery or a lithium ion battery. Battery 3000 supplies a generated DC voltage to converter 2710, and is charged with a DC voltage received from converter 2710.

Converter 2710 includes power transistors Q1, Q2, diodes D1, D2, and a reactor L. Power transistor Q1, Q2 are connected in series across power source lines PL2 and PL3, and receive, at their bases, a control signal from control device 2730. Diodes D1, D2 are connected between the collector and the emitter of power transistors Q1, Q2, respectively, such that an electric current flows from the emitter to the collector of power transistors Q1, Q2, respectively. Reactor L has its one end connected to power source line PL1 connected to the positive electrode of battery 3000, and its other end connected to the connection point of power transistors Q1, Q2.

This converter 2710 boosts a DC voltage received from battery 3000 using reactor L, and supplies the boosted voltage as boosted to power source line PL2. Converter 2710 also steps down a DC voltage received from inverter 2720 to charge battery 3000.

Inverter 2720 includes a U-phase arm 2750U, a V-phase arm 2750V and a W-phase arm 2750W. The respective phase arms are connected in parallel across power source lines PL2 and PL3. U-phase arm 2750U includes power transistors Q3, Q4 connected in series, V-phase arm 2750V includes power transistors Q5, Q6 connected in series, and W-phase arm 2750W includes power transistors Q7, Q8 connected in series. Diodes D3 to D8 are connected between the collector and the emitter of power transistors Q3 to Q8, respectively, such that an electric current flows from the emitter to the collector of power transistors Q3 to Q8, respectively. The connection points of the respective power transistors in the respective phase arms are connected to the opposite side of the neutral points of the respective phase coils of rotating electric machine 2200 as a motor-generator with output lines 2740U, 2740V and 2740W, respectively.

Inverter 2720 converts a DC voltage received from power source line PL2 into an AC voltage based on a control signal from control device 2730 for output to rotating electric machine 2200. Inverter 2720 also rectifies an AC voltage generated by rotating electric machine 2200 to a DC voltage for supply to power source line PL2.

Capacitor C1 is connected across power source lines PL1 and PL3, and smoothes the voltage level of power source line PL1. Capacitor C2 is connected across power source lines PL2 and PL3, and smoothes the voltage level of power source line PL2.

Control device 2730 calculates each phase coil voltage of rotating electric machine 2200 based on a motor torque command value, each phase current value of rotating electric machine 2200, and an input voltage to inverter 2720, and based on the calculated result, generates a PWM (Pulse Width Modulation) signal that turns on/off power transistors Q3 to Q8 for output to inverter 2720.

Control device 2730 also calculates a duty ratio of power transistors Q1, Q2 for optimizing the input voltage to inverter 2720 based on the above-described motor torque command value and the motor speed, and based on the calculated result, generates a PWM signal that turns on/off power transistors Q1, Q2 for output to converter 2710.

Further, control device 2730 controls the switching operation of power transistors Q1 to Q8 in converter 2710 and inverter 2720 so as to convert AC power generated by rotating electric machine 2200 into DC power to charge battery 3000.

In PCU 2700, converter 2710 boosts a DC voltage received from battery 3000 based on a control signal from control device 2730 for supply to power source line PL2. Inverter 2720 receives, from power source line PL2, a DC voltage smoothed by capacitor C2, and converts the received DC voltage into an AC voltage for output to rotating electric machine 2200.

Inverter 2720 also converts an AC voltage generated by the regenerative operation of rotating electric machine 2200 into a DC voltage for output to power source line PL2. Converter 2710 receives a DC voltage smoothed by capacitor C2 from power source line PL2, and steps down the received DC voltage to charge battery 3000.

Figure 2:
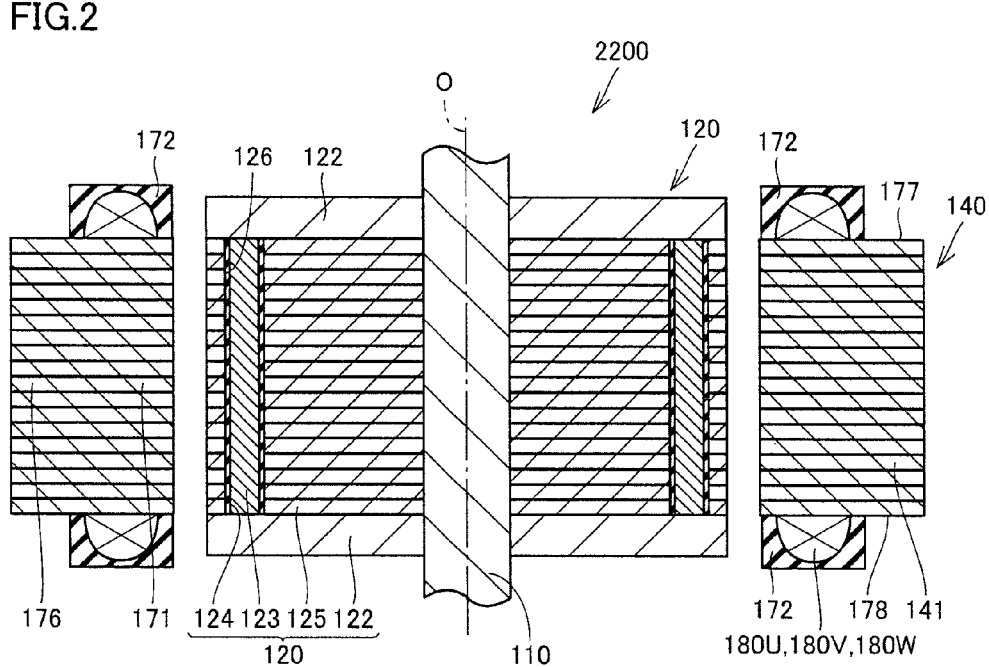
FIG. 2 is a side sectional view showing a schematic structure of the rotating electric machine shown in FIG. 1.

FIG. 2 is a side sectional view showing a schematic structure of rotating electric machine 2200 shown in FIG. 1. As shown in FIG. 2, rotating electric machine 2200 includes a rotation shaft 110 supported rotatably about a rotational centerline 0, rotor 120 provided fixedly to rotation shaft 110 and provided rotatably with rotation shaft 110, and an annular stator 140 provided around rotor 120. This rotating electric machine 2200 is typically mounted on a hybrid vehicle, and functions as a drive source that drives wheels and as a generator that generates electricity from motive power of the engine or the like. Further, rotating electric machine 2200 is also applicable to an electric vehicle that runs only with electrical power without having an engine, and a fuel cell vehicle including, as a vehicle-mounted power source, a fuel cell that generates electrical energy using fuel.

Rotor 120 includes a rotor core 125 of a substantially cylindrical shape with a magnet insertion hole 126 as an example of a hole extending in an axial direction formed therein. Rotor 120 also includes a permanent magnet 123 inserted and embedded in magnet insertion hole 126. Permanent magnet 123 extends in the axial direction of rotor core 125. Rotor 120 also includes an end plate 122 provided at the end face of rotor core 125 in the axial direction. Permanent magnet 123 is secured by means of a resin 124 that fills magnet insertion hole 126.

Stator 140 is formed annularly, and includes a stator core 141 formed annularly so as to surround rotor 120, as well as a U-phase coil 180U, a V-phase coil 180V and a W-phase coil 180W mounted on this stator core 141. An insulating mold resin 172 is provided at axial end faces 177, 178 of this stator 140 (stator core 141). Axial end faces 177, 178 of stator 140 are covered with mold resin 172. This mold resin 172 includes, for example, thermosetting resin such as BMC (Bulk Molding Compound) or epoxy resin, thermoplastic resin such as PPS (Polyphenylene Sulfide) or PBT (Polybutylene Terephthalate), or the like.

Stator core 141 includes a yoke portion 176 extending annularly, and a plurality of stator teeth 171 protruding radially inward from the inner circumferential surface of this yoke portion 176.

Figure 3:
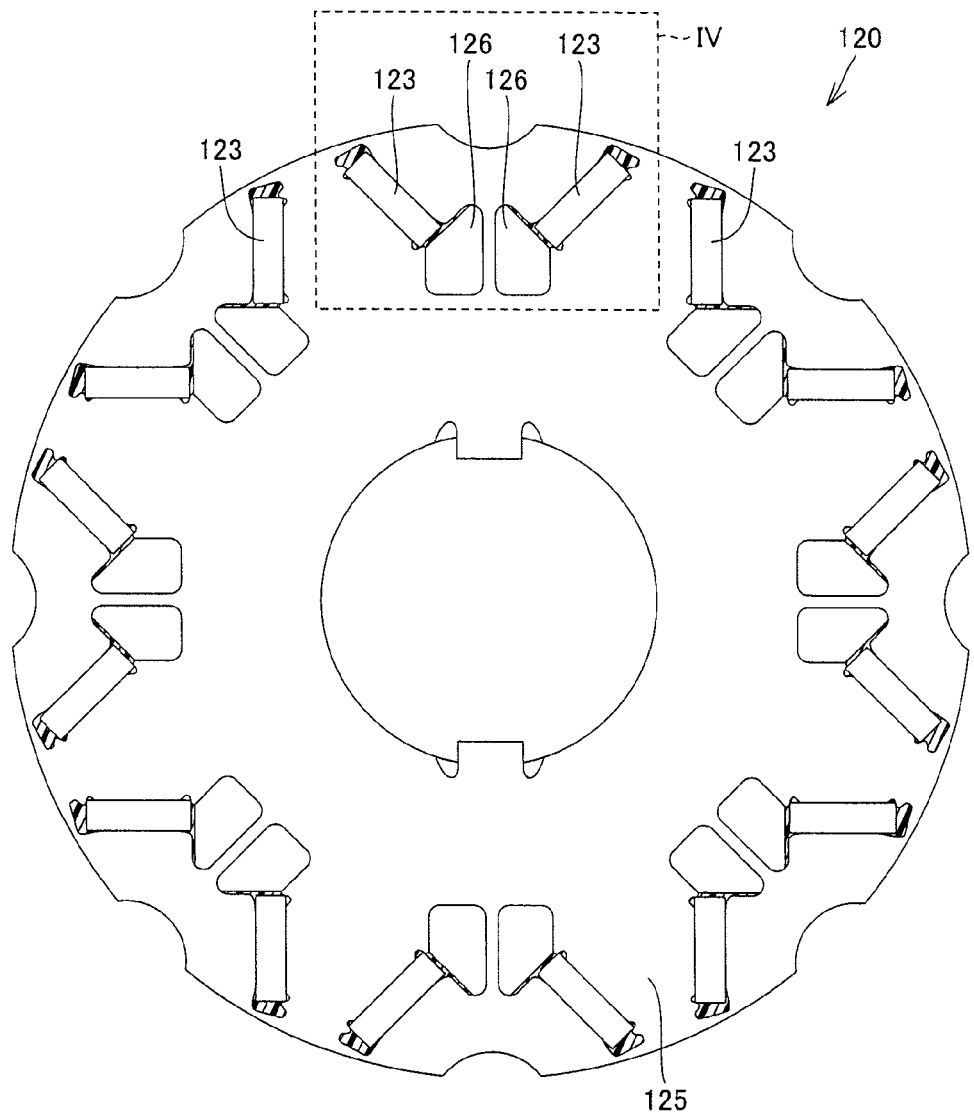
FIG. 3 is a plan view of the rotor as viewed two-dimensionally from the direction of a rotational centerline.
Figure 4:
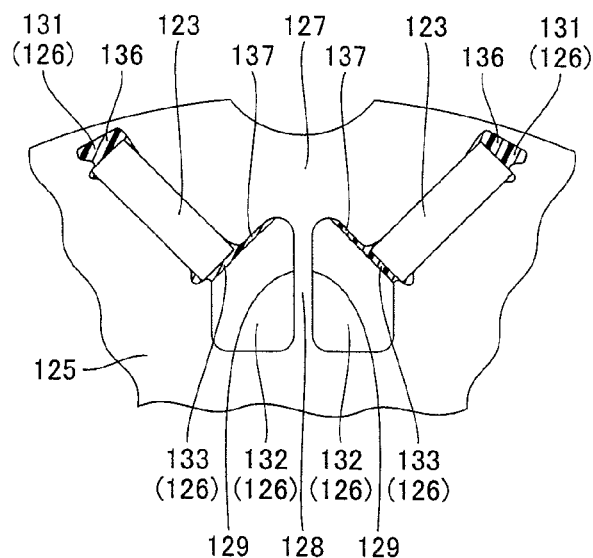
FIG. 4 is an enlarged view of and around a region IV shown in FIG. 3.

FIG. 3 is a plan view of rotor 120 as viewed two-dimensionally from the direction of rotational centerline O. FIG. 4 is an enlarged view of and around a region IV shown in FIG. 3. Referring to FIGS. 3 and 4, a plurality of magnet insertion holes 126 are formed in rotor core 125. The plurality of magnet insertion holes 126 are formed such that two corresponding magnet insertion holes 126 are paired. Magnet insertion hole 126 is formed extending in an inclined direction relative to the radial direction of rotor core 125 of substantially cylindrical shape. Paired two magnet insertion holes 126 extend in symmetrical directions relative to the radial direction of rotor core 125.

Permanent magnets 123 disposed in magnet insertion holes 126 extend in inclined directions relative to the radial direction of rotor core 125. The direction in which permanent magnet 123 inserted in one of paired magnet insertion holes 126 is inclined relative to the radial direction and the direction in which permanent magnet 123 inserted in the other magnet insertion hole 126 is inclined relative to the radial direction are symmetric relative to the radial direction of rotor core 125. Permanent magnets 123 inserted in paired magnet insertion holes 126 thus form a V-shape.

Since paired permanent magnets 123 are arranged to form a V-shape, the density of magnetic flux that travels from permanent magnets 123 to the radially outer side of rotor core 125 is increased at the circumferentially central part of the V-shape.

Rotor core 125 includes a wall 127 that separates paired magnet insertion holes 126 from each other in the circumferential direction. Rotor core 125 has formed therein one magnet insertion hole 126 extending in the axial direction of rotor core 125 as well as the other magnet insertion hole 126 extending in the axial direction of rotor core 125 and adjacent to the above-described one magnet insertion hole 126 in the circumferential direction of rotor core 125. Wall 127 separates the above-described one magnet insertion hole 126 and the other magnet insertion hole 126 from each other. Wall 127 has a most proximate portion 128 at the innermost side in the radial direction of rotor core 125 where one magnet insertion hole 126 and the other magnet insertion hole 126 are most proximate to each other.

Permanent magnet 123 is disposed in magnet insertion hole 126 so as to partition magnet insertion hole 126 in the radial direction. Permanent magnet 123 defines a section in magnet insertion hole 126 located at the radially outer side relative to permanent magnet 123 as an outer region 131. In magnet insertion hole 126, permanent magnet 123 also defines a section in magnet insertion hole 126 located at the radially inner side relative to permanent magnet 123 as an inner region 134 which will be described later.

As shown in FIG. 4, outer region 131 is filled with a resin material that functions as an adhesive for securing permanent magnet 123 to rotor core 125, thereby forming a resin layer 136. Resin layer 136 covers the surface at the radially outer side of permanent magnet 123. A section of inner region 134 is filled with the resin material that functions as an adhesive for securing permanent magnet 123 to rotor core 125, thereby forming a resin layer 137. Resin layer 137 covers the radially inner surface of permanent magnet 123. Resin layer 137 is formed only at the position in inner region 134 that faces permanent magnet 123, and secures permanent magnet 123 from the radially inner side.

Another section of inner region 134 forms a hollow space 132 extending in the axial direction. Hollow space 132 is a space, in magnet insertion hole 126 formed in rotor core 125, that is not filled with permanent magnet 123 or resin for securing permanent magnet 123, where no object exists. Paired hollow spaces 132 define the width of most proximate portion 128 in the circumferential direction where wall 127 that separates magnet insertion holes 126 has the smallest width.

Hollow space 132 has a function of improving the performance of rotating electric machine 2200. That is, by leaving hollow space 132 having a large resistance to the flow of magnetic flux between paired permanent magnets 123, the width of wall 127 through which magnetic flux is likely to flow is narrowed, so that the path of magnetic flux between permanent magnets 123 becomes small. This prevents the magnetic flux exited from permanent magnet 123 from returning to the same permanent magnet 123 and leads the magnetic flux to the radially outer side that is the essential magnetic flux direction. Therefore, the effective magnetic flux that contributes to generation of rotary force of the rotating electric machine increases.

In an IPM (Interior Permanent Magnet) motor with permanent magnets 123 embedded in rotor core 125, reluctance torque can be utilized together with magnet torque produced by permanent magnet 123. By maximizing reluctance torque, a required number of permanent magnets 123 can be reduced. In order to obtain higher reluctance torque, it is necessary to decrease the angle of inclination of permanent magnet 123 relative to the radial direction of rotor core 125. As the angle of inclination of permanent magnet 123 is adjusted to be smaller, paired permanent magnets 123 that form a V-shape will be separate from each other, so that the distance between paired permanent magnets 123 will be increased.

When paired permanent magnets 123 are arranged separately from each other, it is necessary to make hollow space 132 large in order to keep the width of most proximate portion 128 in the circumferential direction small. In this case, if resin for securing permanent magnet 123 is charged everywhere in hollow space 132, a required amount of resin will be increased. Moreover, thermal expansion of a resin material increases along with the increase in the amount of resin, so that a stress from resin is more likely to act on most proximate portion 128 of wall 127 to damage most proximate portion 128. However, in rotor 120 of the present embodiment, hollow space 132 is formed as a hollow space that is not filled with resin. Only part of magnet insertion hole 126 at the radially inner side relative to permanent magnet 123 is filled with resin for securing permanent magnet 123 embedded in rotor core 125. Thus, the used amount of resin can be reduced.

Resin layer 137 that secures permanent magnet 123 from the radially inner side of rotor core 125 covers the surface of permanent magnet 123. Resin layer 137 is made of charged resin so as to entirely cover part of permanent magnet 123 that faces inner region 134 described above. By thus forming resin layer 137, the reliability in adhesive strength between the resin material for securing permanent magnet 123 and permanent magnet 123 can be ensured. Even when chipping or cracking takes place in part of permanent magnet 123 during driving of rotor 120, fragments of permanent magnet 123 can be prevented from scattering.

Resin layer 137 also contacts the inner surface of magnet insertion hole 126. Part of the inner surface of magnet insertion hole 126 is exposed to hollow space 132. As shown in FIG. 4, a side surface 129 of most proximate portion 128 forms part of the inner surface of magnet insertion hole 126, and this side surface 129 is exposed to hollow space 132. That is, resin layer 137 is out of contact with side surface 129 of most proximate portion 128.

Of wall 127 that separates paired magnet insertion holes 126, most proximate portion 128 is a portion having the lowest strength. By forming resin layer 137 out of contact with most proximate portion 128, a stress from resin layer 137 can be prevented from acting directly on most proximate portion 128 even if resin layer 137 heated by the temperature rise of rotor 120 thermally expands. Therefore, the strength of most proximate portion 128 can be secured.

Since damage to most proximate portion 128 is less likely to occur, the performance of rotating electric machine 2200 can further be improved by decreasing the width of most proximate portion 128 in the circumferential direction of rotor core 125 to further narrow the path of magnetic flux between permanent magnets 123 in the circumferential direction, so that flux leakage is reduced.

Inner region 134 obtained by partitioning the inside of magnet insertion hole 126 by permanent magnet 123 has a capacity larger than the capacity of outer region 131. Accordingly, with the structure of the present embodiment, the effect with which the required amount of resin for securing permanent magnet 123 can be reduced can be achieved more remarkably as compared with the case of filling the whole inner region 134 with the resin material.

Figure 5:
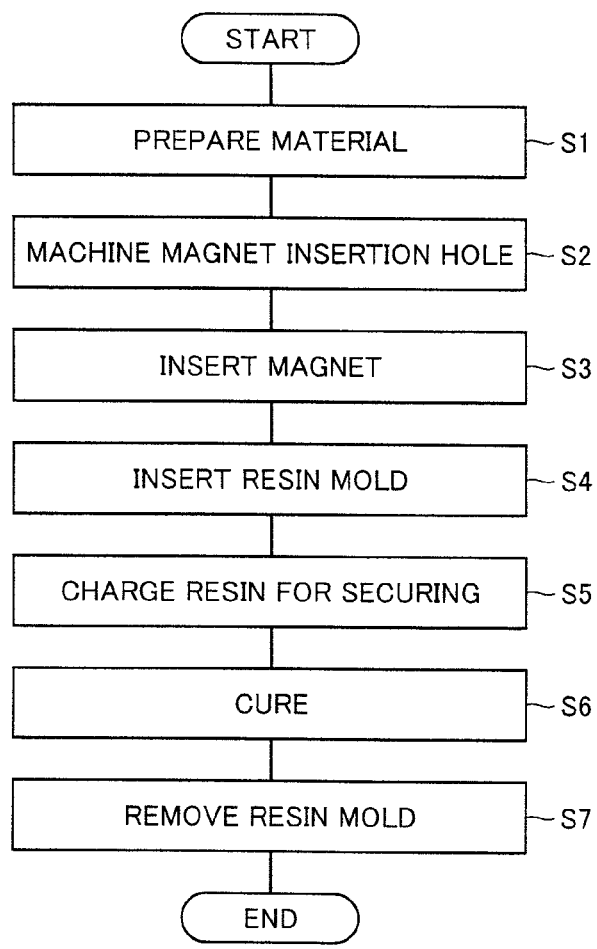
FIG. 5 is a flow chart showing a method of manufacturing the rotor of the first embodiment.

A method of manufacturing rotor 120 having the structure described above will now be described. FIG. 5 is a flow chart showing a method of manufacturing the rotor of the first embodiment. As shown in FIG. 5, first, in Step (S1), a material that forms rotor core 125 is prepared. Rotor core 125 may be formed by stacking a plurality of electromagnetic steel sheets or the like in the axial direction, or may be formed of a dust core obtained by press molding a mixture containing magnetic particles such as iron particles and an insulating material such as resin.

Figure 6:
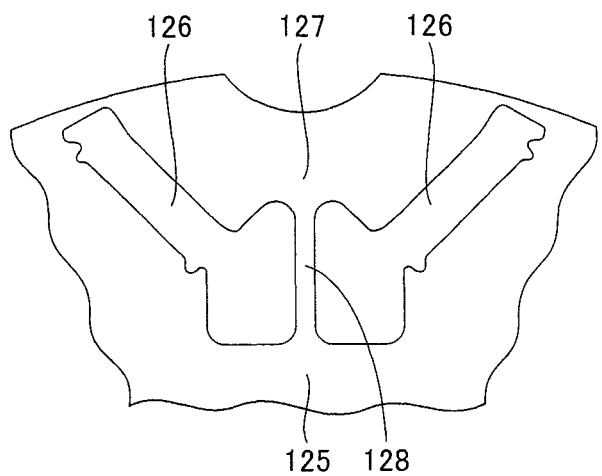
FIG. 6 is a schematic diagram showing the state where magnet insertion holes have been formed in the rotor core.

Then, in Step (S2), magnet insertion holes 126 extending in the axial direction are formed in rotor core 125. FIG. 6 is a schematic diagram showing the state where magnet insertion holes 126 have been formed in rotor core 125. As shown in FIG. 6, a pair of magnet insertion holes 126 are formed in rotor core 125, and wall 127 that separates magnet insertion holes 126 from each other is provided. At the inner side of rotor core 125 in the radial direction, wall 127 has most proximate portion 128 where the spacing between magnet insertion holes 126 is the smallest. Magnet insertion holes 126 are formed in rotor core 125 such that paired magnet insertion holes 126 form a substantially V-shape, and rotor core 125 with magnet insertion holes 126 formed therein is prepared.

Figure 7:
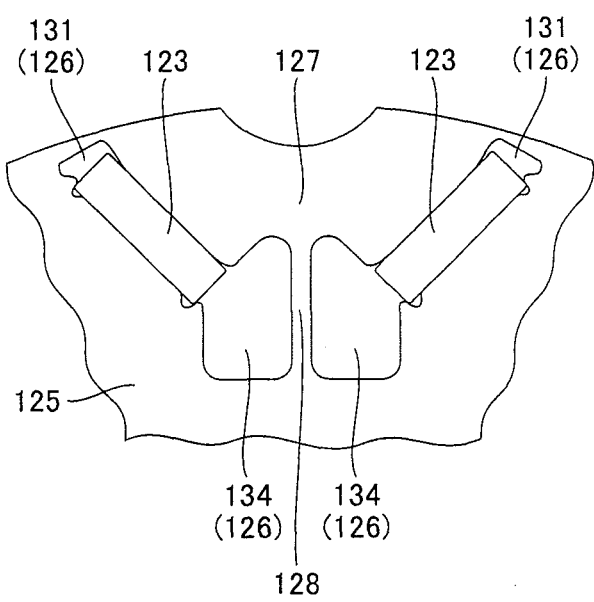
FIG. 7 is a schematic diagram showing the state where the permanent magnets have been inserted in magnet insertion holes.

Then, in Step (S3), permanent magnets 123 are embedded in magnet insertion holes 126. FIG. 7 is a schematic diagram showing the state where permanent magnets 123 have been inserted in magnet insertion holes 126. As shown in FIG. 7, permanent magnet 123 is disposed in magnet insertion hole 126 so as to partition magnet insertion hole 126 in the radial direction to leave spaces at the both ends of permanent magnet 123 in the radial direction. In magnet insertion hole 126, outer region 131 at the radially outer side and inner region 134 at the radially inner side are defined by permanent magnet 123. Inner region 134 is formed larger than outer region 131. Most proximate area 128 of wall 127 is provided so as to separate paired inner regions 134 from each other.

Figure 8:
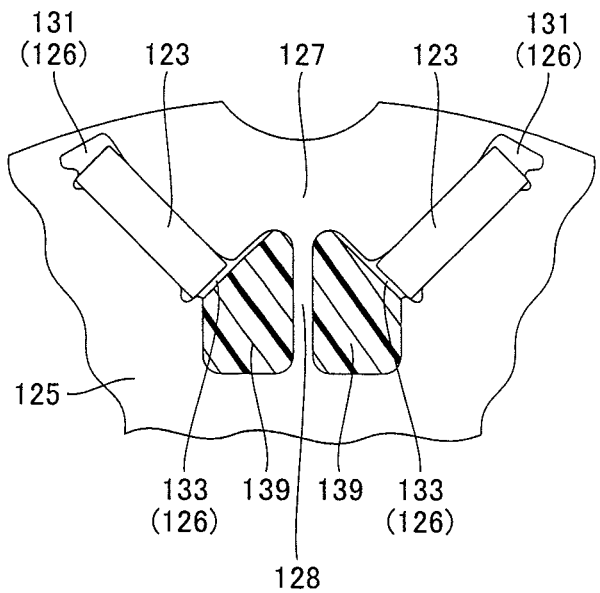
FIG. 8 is a schematic diagram showing the state where resin molds have been inserted in inner regions.

Then, in Step (S4), resin mold 139 is inserted in inner region 134. FIG. 8 is a schematic diagram showing the state where resin molds 139 have been inserted in inner regions 134. As shown in FIG. 8, resin mold 139 made of resin is disposed at a side proximate to most proximate portion 128 in inner region 134. At this time, an air gap 133 kept to be hollow where resin mold 139 is not provided is left between permanent magnet 123 and resin mold 139. Resin mold 139 is disposed such that permanent magnet 123 does not contact resin mold 139 and the surface of permanent magnet 123 facing inner region 134 is exposed to air gap 133. Resin mold 139 separates air gap 133 as a resin-filled section to be filled with resin and hollow space 132 to be formed in a subsequent step.

Figure 9:
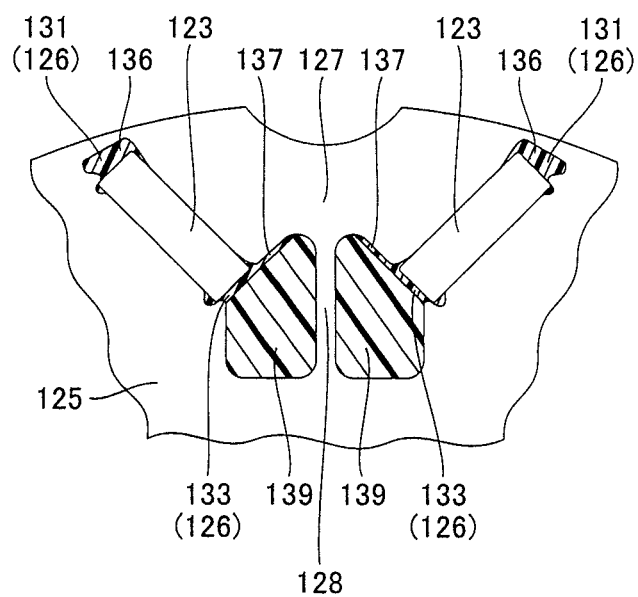
FIG. 9 is a schematic diagram showing the state where resin layers have been formed within the magnet insertion holes.

Then, in Step (S5), air gap 133 between permanent magnet 123 and resin mold 139 is filled with an adhesive for securing permanent magnet 123 to rotor core 125. At this time, not only air gap 133 but also the inside of outer region 131 is filled with the adhesive, and the adhesive is charged so as to cover the surface of permanent magnet 123. Then, in Step (S6), the charged adhesive is cured. A resin layer 136 is thereby formed in outer region 131, and resin layer 137 is formed in air gap 133 that forms part of inner region 134. FIG. 9 is a schematic diagram showing the state where resin layers 136, 137 have been formed in magnet insertion hole 126. Resin layer 137 is formed at a position in inner region 134 that does not contact most proximate portion 128 of wall 127.

The resin material for forming resin layers 136, 137 is any material that has a heat resistant temperature more than or equal to 150 to 160° C., which is the demagnetization temperature of permanent magnet 123, and excellent fluidity for entering air gap 133 and outer region 131. Engineering plastic represented by, for example, BMC, PPS, epoxy resin, liquid crystal polymer, or the like may be used as the resin material.

Then, in Step (S7), resin mold 139 is removed from inner region 134. After resin mold 139 is extracted, hollow space 132 is left. Rotor 120 of the first embodiment shown in FIG. 4 is thus completed. Since resin mold 139 is slid over the inner surface of inner region 134 at the time of insertion into and removal from inner region 134, resin mold 139 is desirably made of a material excellent in wear resistance that is less likely to cause wear during sliding.

With the above-described method of manufacturing rotor 120, rotor 120 having the structure of the present embodiment can easily be obtained. With this rotor 120, only minute air gap 133 between resin mold 139 and permanent magnet 123 in inner region 134 is filled with resin for securing permanent magnet 123. Therefore, the amount of required resin can be reduced, which can achieve reduction in weight and cost of rotor 120. In addition, since hollow space 132 is left between resin layer 137 and side surface 129 of most proximate portion 128, a stress from resin layer 137 can be prevented from acting directly on most proximate portion 128 when resin layer 137 rises in temperature and thermally expands, so that the strength of most proximate portion 128 can be secured.

(Second Embodiment)

Figure 10:
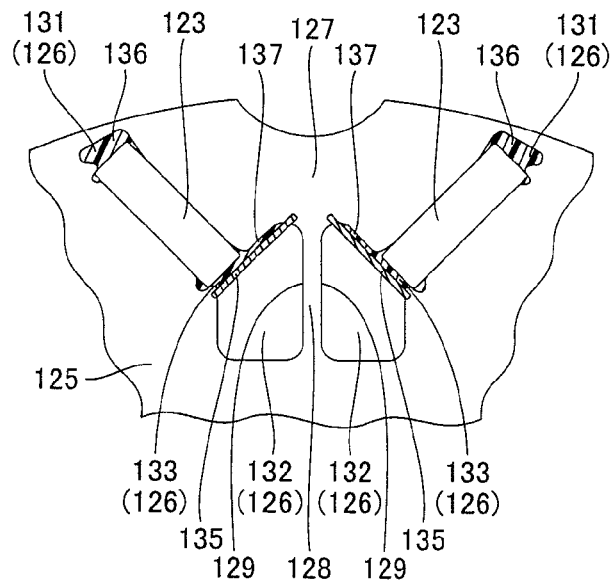
FIG. 10 is a schematic diagram showing a structure of a rotor of a second embodiment.

FIG. 10 is a schematic diagram showing a structure of rotor 120 of a second embodiment. Rotor 120 of the second embodiment and the above-described rotor of the first embodiment basically have a similar structure. However, the second embodiment differs from the first embodiment in that a partition member 135 is provided which is disposed in magnet insertion hole 126 and separates air gap 133 in which resin layer 137 is to be formed from hollow space 132.

That is, in rotor 120 of the second embodiment, air gap 133 is left between plate-like partition member 135 disposed in inner region 134 in magnet insertion hole 126 and permanent magnet 123, and this air gap 133 is filled with resin, so that resin layer 137 is formed. Partition member 135 can be made of a material that is nonmagnetic and has high electric resistance such that an eddy current is less likely to flow therethrough when magnetic flux exited from permanent magnet 123 flows therethrough. For example, partition member 135 may be made of stainless steel, aluminum or the like.

Figure 11:
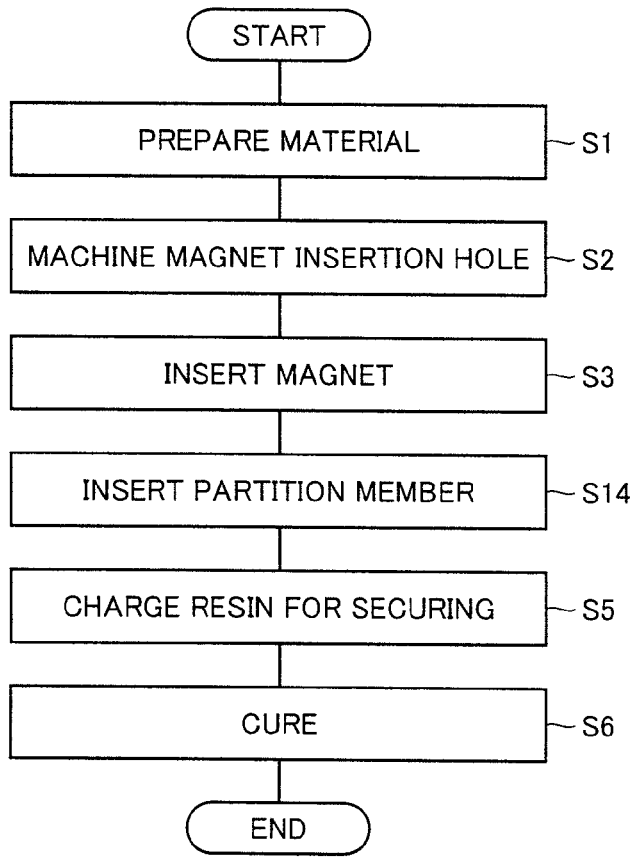
FIG. 11 is a flow chart showing a method of manufacturing the rotor of the second embodiment.
Figure 12:
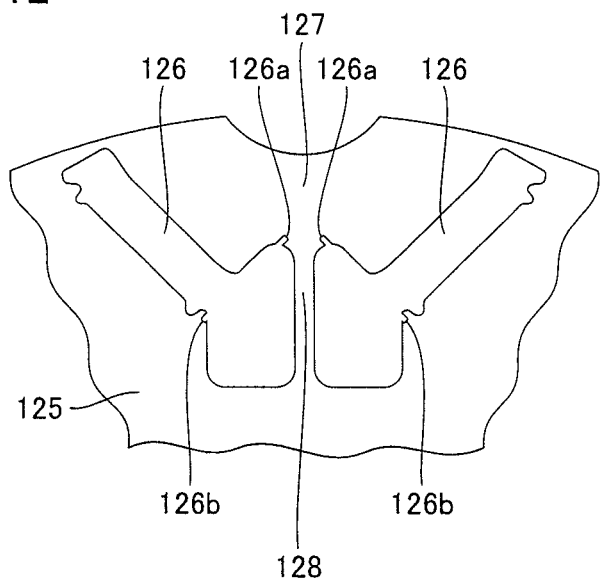
FIG. 12 is a schematic diagram showing the state where magnet insertion holes have been formed in a rotor core of the second embodiment.
Figure 13:
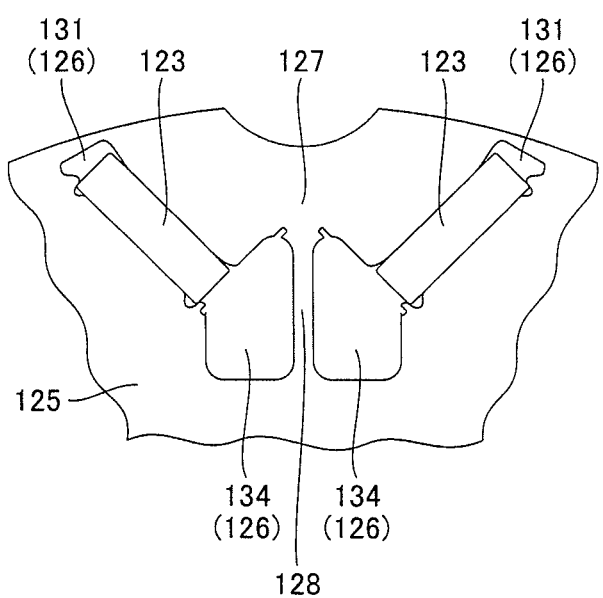
FIG. 13 is a schematic diagram showing the state where permanent magnets have been inserted in the magnet insertion holes of the second embodiment.

FIG. 11 is a flow chart showing a method of manufacturing rotor 120 of the second embodiment. FIG. 12 is a schematic diagram showing the state where magnet insertion holes 126 have been formed in rotor core 125 of the second embodiment. FIG. 13 is a schematic diagram showing the state where permanent magnets 123 have been inserted in magnet insertion holes 126 of the second embodiment. Steps (S1) to (S3) shown in FIG. 11 are similar to those of the first embodiment described with reference to FIG. 5, and detailed description thereof will not be repeated. In magnet insertion hole 126 of the second embodiment, however, as clearly shown in FIG. 12, the inner surface of magnet insertion hole 126 is partly recessed, so that recesses 126a, 126b that can hold plate-like partition member 135 are formed.

Figure 14:
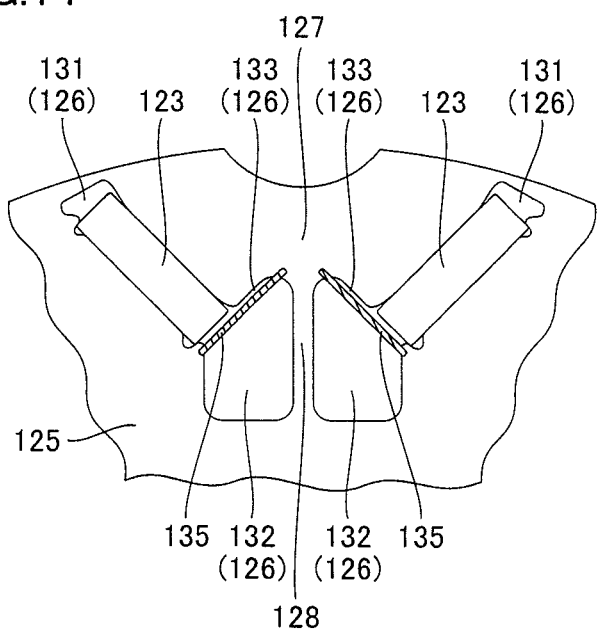
FIG. 14 is a schematic diagram showing the state where partition members have been inserted in inner regions.

Subsequently, in Step (S14), partition member 135 that partitions inner region 134 is inserted in inner region 134. FIG. 14 is a schematic diagram showing the state where partition members 135 have been inserted in inner regions 134. As shown in FIG. 14, by inserting partition member 135, inner region 134 shown in FIG. 13 is partitioned into air gap 133, which is a small hollow space between partition member 135 and permanent magnet 123, and hollow space 132 to which most proximate portion 128 of wall 127 that separates paired magnet insertion holes 126 is exposed. Partition member 135 is disposed such that permanent magnet 123 does not contact partition member 135 and the surface of permanent magnet 123 facing inner region 134 is exposed to air gap 133. Partition member 135 separates air gap 133 as a resin-filled section to be filled with resin and hollow space 132.

Then, in Step (S5), air gap 133 between permanent magnet 123 and partition member 135 is filled with an adhesive for securing permanent magnet 123 to rotor core 125. At this time, not only air gap 133 but also the inside of outer region 131 is filled with the adhesive, and the adhesive is charged so as to cover the surface of permanent magnet 123. Then, in Step (S6), the charged adhesive is cured. Resin layer 136 is thereby formed in outer region 131, and resin layer 137 is formed in air gap 133 that forms part of inner region 134. Rotor 120 of the second embodiment including partition member 135 shown in FIG. 10 is thus completed.

With the above-described method, rotor 120 having the structure of the second embodiment can easily be obtained. With this rotor 120 of the second embodiment, only minute air gap 133 between partition member 135 and permanent magnet 123 in inner region 134 is filled with resin for securing permanent magnet 123. Therefore, similarly to the first embodiment, the effects that can reduce the amount of resin required for securing permanent magnet 123 and can ensure the strength of most proximate portion 128 can be achieved.

When forming resin layer 137 using resin mold 139 described in the first embodiment, if inner region 134 in magnet insertion hole 126 has a complicated shape, stemming of the adhesive by resin mold 139 may become insufficient, so that the adhesive may flow toward most proximate portion 128 of wall 127. In contrast, if air gap 133 and hollow space 132 are formed as completely separate spaces using partition member 135, hollow space 132 can be reliably left as a hollow space that is not filled with resin. On the other hand, when the charged adhesive can be stemmed reliably by resin mold 139, the effect that can reduce the number of members that rotor 120 requires can be achieved with the structure of the first embodiment.

Although the embodiments of the present invention have been described above, it should be understood that the embodiments disclosed herein are illustrative and non-restrictive in every respect. The scope of the present invention is defined by the terms of the claims, rather than the description above, and is intended to include any variations within the scope and meaning equivalent to the terms of the claims.

INDUSTRIAL APPLICABILITY

The rotor of the present invention may be applied particularly advantageously to a rotating electric machine used as a generator or a drive source mounted on a vehicle such as a hybrid vehicle or an electric vehicle.

REFERENCE SIGNS LIST

110 rotation shaft; 120 rotor; 123 permanent magnet; 125 rotor core; 126 magnet insertion hole; 126a, 126b recess; 127 wall; 128 most proximate portion; 129 side surface; 131 outer region; 132 hollow space; 133 air gap; 134 inner region; 135 partition member; 136, 137 resin layer; 139 resin mold; 2200 rotating electric machine

The invention claimed is:

1. A rotor comprising:
   a rotor core provided fixedly to a rotation shaft and having a hole extending in an axial direction formed therein; and
   a magnet embedded in said hole and extending in said axial direction and extending in a direction inclined relative to a radial direction of said rotor core, wherein
   said magnet partitions said hole in said radial direction to contact a pair of opposite inner surfaces of said hole to define, in said hole, an outer region at an outer side in the radial direction and an inner region being separated from said outer region at an inner side in the radial direction relative to said magnet,
   in said inner region, a resin layer filled with resin and a hollow space unfilled with resin are formed,
   said resin layer covers a radially inner surface of said magnet, secures said magnet to said rotor core from the radially inner side, and is in contact with an inner surface of said hole,
   part of said inner surface is exposed to said hollow space,
   said inner region has a capacity larger than a capacity of said outer region, and
   the outer region is located at a more radially outward position than a radially outer surface of the magnet, and the inner region is located at more radially inward position than a radially inner surface of the magnet;
   the resin layer has a shape of a substantially thin plate and has a first plane which covers the radially inner surface of the magnet and makes a contact with the inner surface of the hole; and
   the resin layer has a first surface and a second surface opposing the first surface, the first surface covers the radially inner surface of the magnet and makes contact with the inner surface of the hole, and the second surface faces the hollow space and does not contact the inner surface of the hole.

2. The rotor according to claim 1, comprising a partition member disposed in said hole to separate said resin layer and said hollow space.

3. The rotor according to claim 2, wherein
   said rotor core has formed therein another hole extending in said axial direction and adjacent to said hole in a circumferential direction of said rotor core,
   said rotor core includes a wall that separates said hole and said other hole in said circumferential direction,
   said wall has a most proximate portion at an innermost side in said radial direction where said hole and said other hole are most proximate to each other, and
   a side surface of said most proximate portion is exposed to said hollow space.

4. The rotor according to claim 1, wherein
   said rotor core has formed therein another hole extending in said axial direction and adjacent to said hole in a circumferential direction of said rotor core,
   said rotor core includes a wall that separates said hole and said other hole in said circumferential direction,
   said wall has a most proximate portion at an innermost side in said radial direction where said hole and said other hole are most proximate to each other, and
   a side surface of said most proximate portion is exposed to said hollow space.

* * * * *